United States Patent [19]

Ford

[11] Patent Number: 4,719,560

[45] Date of Patent: Jan. 12, 1988

[54] ROTARY PHASE GENERATOR AND SYSTEM

[76] Inventor: Horace B. Ford, 13 Catherine Dr., Granbury, Tex. 76048

[21] Appl. No.: 845,569

[22] Filed: Mar. 28, 1986

[51] Int. Cl.⁴ .......................................... H02M 5/32
[52] U.S. Cl. ..................... 363/150; 310/161; 318/768; 318/769; 323/204; 363/102; 363/149
[58] Field of Search ................. 310/161; 318/768, 769; 322/95, 96; 323/201, 204; 363/102, 149, 150

[56] References Cited

U.S. PATENT DOCUMENTS

| | | | |
|---|---|---|---|
| 3,387,202 | 6/1968 | Buffington | 363/150 |
| 3,670,238 | 6/1972 | Ronk | 363/150 |
| 4,079,446 | 3/1978 | Hertz | 318/769 |
| 4,158,225 | 6/1979 | Hertz | 363/150 |
| 4,249,237 | 2/1981 | Ronk et al. | 363/150 |
| 4,513,237 | 4/1985 | Ford | 318/768 |

Primary Examiner—Patrick R. Salce
Assistant Examiner—Jeffrey Sterrett
Attorney, Agent, or Firm—Wm. T. Wofford; James C. Fails; Arthur F. Zobal

[57] ABSTRACT

A rotary phase generator for generating 3 phase voltage is provided which can operate off of 230 or 460 volts A-C. Also provided is a rotary phase generator which has two groups of running capacitors for providing a stable voltage on the third phase at no load and light loads. In addition, a booster system is provided for a rotary phase generator to provide high starting torque to one or more of the motors operated on the rotary phase generator. A plurality of smaller rotary phase generators may be connected in parallel and started in time delay sequence to eliminate the heavy starting current when starting the system on one phase power.

31 Claims, 13 Drawing Figures

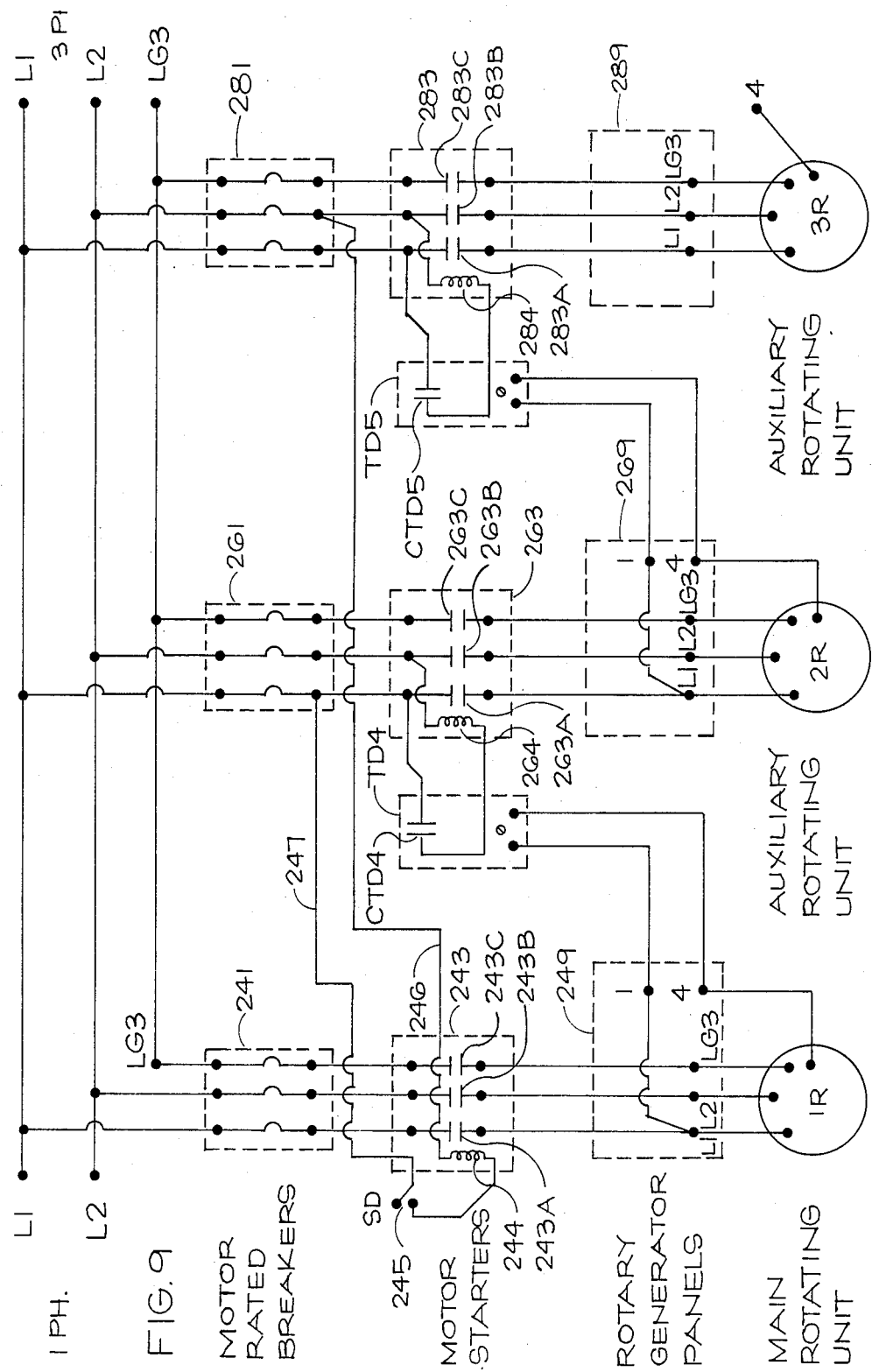

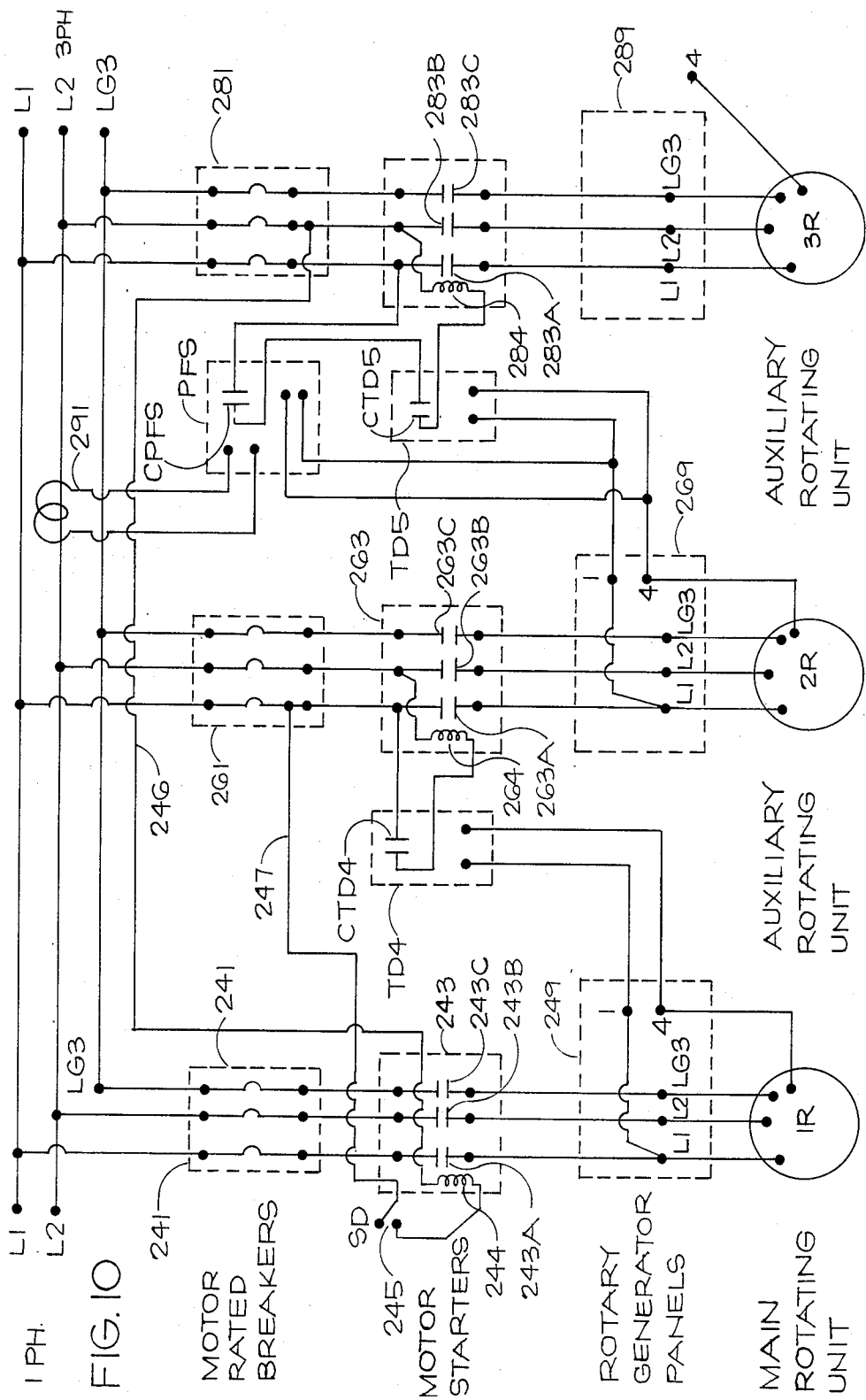

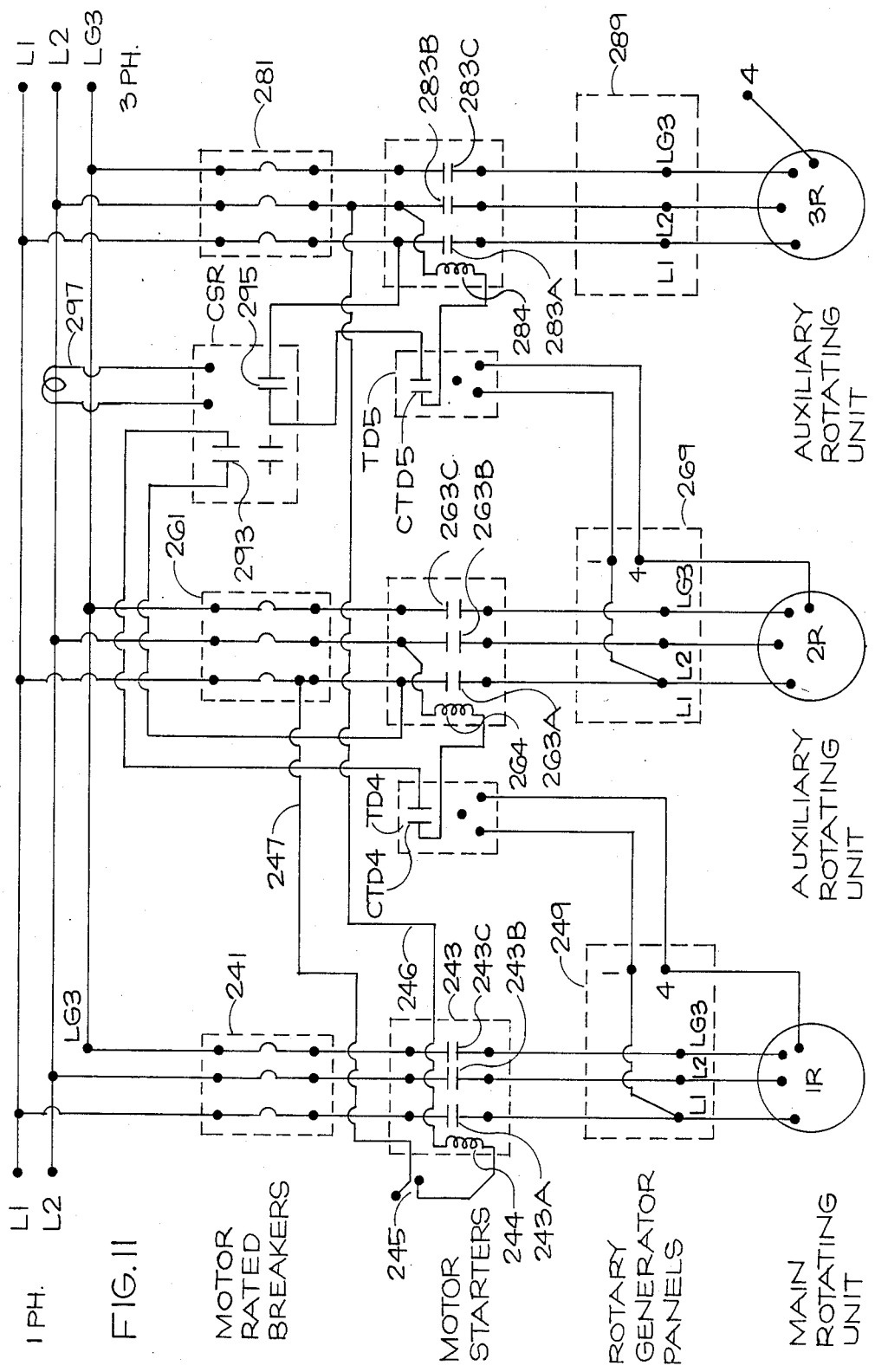

ROTARY PHASE GENERATOR AND SYSTEM

BACKGROUND OF THE INVENTION

1. Field of the Invention

The invention relates to rotary phase generators for converting one phase A-C power to three phase A-C power.

2. Description of the Prior Art

A rotary phase generator is a rotating machine which has an input of 1 phase AC power; and has an output of 3 phase power. The input and output voltages are essentially the same. The machine may be rated in KVA. The machine is used primarily to operate 3 phase electric motors on 1 phase power. Several motors may be operated on one rotary phase generator. The prior art machines in use at this time consist of a 3 phase motor, a high slip (high resistance) rotor, and running capacitors connected from 1 of 2 phase windings to the 3rd phase winding. The 1 phase power is applied to the first 2 phase windings, and the 3 phase power is taken from all 3 phase windings. The 3rd phase winding acts also as a starting winding. The machine starts and runs similar to a 1 phase, permanent capacitor motor (low starting torque capacitor motor). The high slip motor is used so that the machine will start on the low capacity running capacitors, and once started, the high resistance rotor then becomes a detriment to the machine. The high slip (high resistance) rotor of the motor operates at a higher temperature than a motor with a standard rotor. The high temperature is detrimental to the bearings and other parts of the machine. The high resistance rotor also has a tendency to open up (rotor bars part) more so than a standard (low resistance) rotor, especially when operated at no load or light load. The machine is not very stable at no load or light load as to voltage. To get the machine to hold at a fairly normal voltage at full load, capacitance is added to the capacitor phase. The capacitor phase will then be about 25% higher than the input voltage at no load or light load. Voltage may then be 230/230/287. The rural power companies very often run their voltage as high as 250 volts. The voltage of the machine may then be 250/250/312 at no load or light load. The voltage will drop rapidly on the capacitor phase as the machine is loaded. At full load the voltage on the capacitor phase may be as much as 15% low. The high voltage is detrimental to equipment which does not load the machine very much, and the low voltage at full load is also detrimental to motors operating on the machine. The locked torque of motors operated on a rotary phase generator is very low (less than 100%). A static type phase converter is sometimes used with one or more of the load motors to boost the starting torque when higher starting torque is required.

Rotary phase generators are very useful, and are becoming more valuable as the rural loads increase. These rural power systems are largely 1 phase. Some of the motors being installed in these area are quite large. The need for really dependable and improved rotary phase generator systems is real. There is also a need for these machines not used in rural areas; such as small factories, machine shops, etc., where 3 phase power is not available.

SUMMARY OF THE INVENTION

It is an object of the invention to provide a dual voltage rotary phase generator.

It is also an object of the invention to provide a rotary phase generator which has a stable voltage on the 3rd phase at no load and light loads.

It is another object of the invention to provide a rotary phase generator with a booster system to provide high starting torque to one or more of the motors operated on the rotary phase generator.

It is also an object of the invention to provide a rotary phase generator with a rotor of low resistance so that the heat rise in the rotor will not be detrimental to the bearings and other parts of the machine.

It is also an object of the invention to provide a dependable starting system for the rotating unit which has a standard rotor (low resistance) so that the machine will start on 1 phase power without the high slip rotor.

It is a further object of the invention to provide a multi-stage rotary phase generator system which will eliminate the heavy starting current when starting the rotating unit on the 1 phase power. It is possible by this system to operate large manufacturing plants or other loads with this system on 1 phase power. Two or more small rotating units are connected in parallel and started in time delay sequence. The power factor and efficiency are comparable with that of a load operated on standard 3 phase power.

BRIEF DESCRIPTION OF THE DRAWINGS

FIGS. 9, 10, and 11 illustrate a multi-stage rotary phase generator system connected for various applications.

DESCRIPTION OF THE PREFERRED EMBODIMENT

Figure 1:
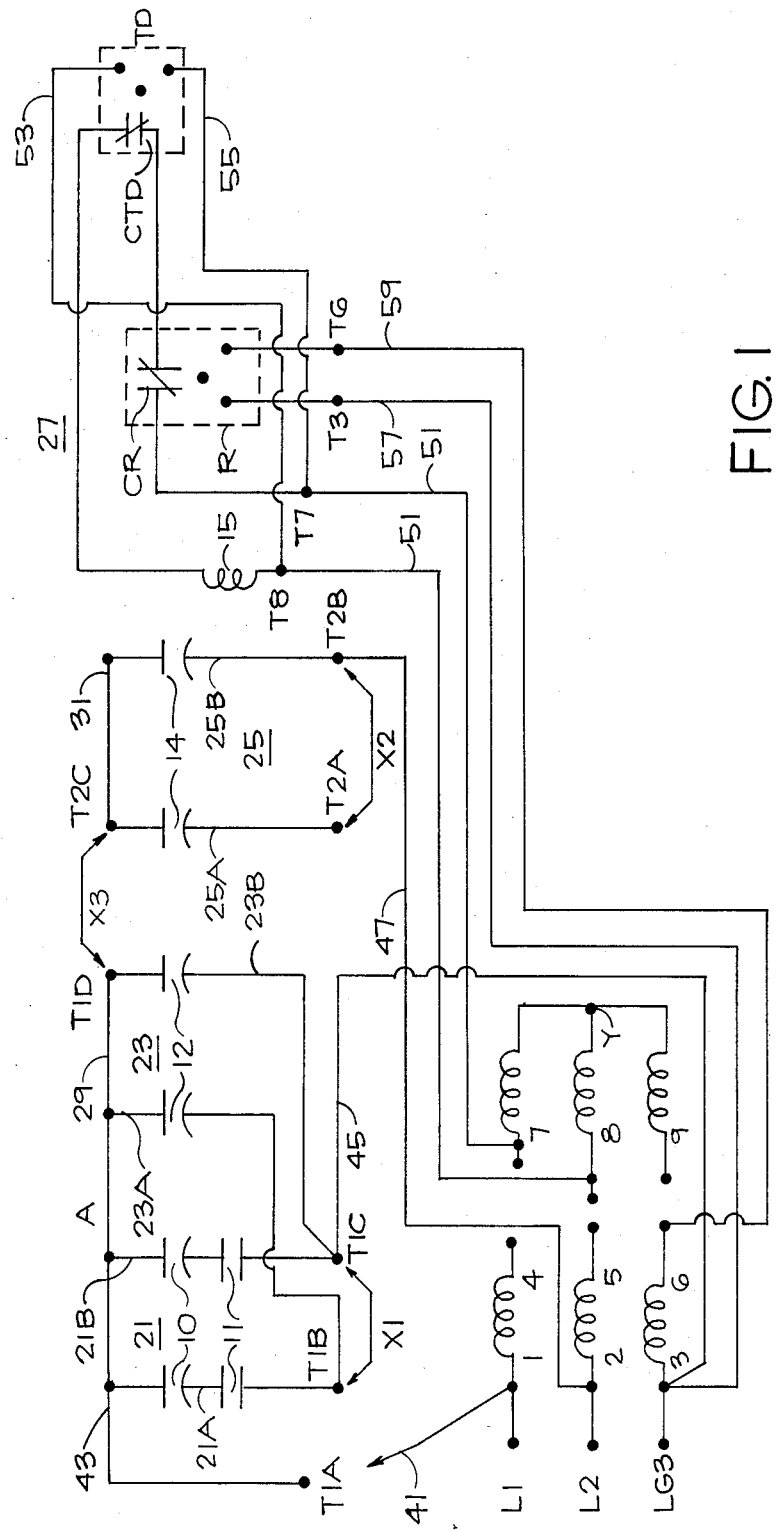
FIG. 1 is an electrical schematic of a dual voltage rotary phase generator of the invention.

The principle of the rotary phase generator has been known for many years. It was first noticed that if a large 3 phase motor was brought to a 1 phase condition by loss of 1 phase of the incoming power, smaller motors on the same circuit would start and run as if they were operating on 3 phase power, as long as the larger motor continued to run. The larger motor would run without any damage if it were not loaded. The large 3 phase motor, of course, will not start on 1 phase power. Capacitors placed from phase windings 1 or 2 to phase winding 3 will cause the larger motor to start, and 3 phase power is then taken from the phase windings 1, 2, and 3 of the motor.

According to one aspect of this invention, starting capacitors are placed from phase winding 1 to phase winding 3. These capacitors are electrolytic starting capacitors. They are to start the rotating unit, and are relieved by a voltage sensitive relay responsive to counter EMF, and therefore RPM responsive. The voltage sensitive relay is backed by a time delay relay so that if for any reason the voltage sensitive delay does not actuate, the time delay relay will then actuate and cause the starting capacitors to be relieved. This system is very dependable. From phase winding 1 to phase winding 2 running capacitors are connected. From phase winding 1 to phase winding 3 running capacitors of a different and greater value are connected. The different values of capacitance connected in this way, and by connecting exactly the correct amount of capacitance, a very improved balance of output voltage is accomplished. The 3rd phase (manufactured phase) is controlled to an acceptabe limit at no load and full load ($\pm 10\%$ of line voltage or better).

A booster control has been integrated into the controls of some versions of the rotary phase generator which will start the largest motor or motors with high torque. This is done by using starting capacitors (electrolytic) to start the motor or motors which require high starting torque. The capacitors are controlled in the same way as described of their use in starting the rotating unit. A 3 phase motor starting in this manner on 1 phase power uses 2 phases for a running winding and the 3rd phase for a starting winding. The three phase winding is converted into a 1 phase (capacitor start) winding, and will start with high torque. This is the principle which is used to start the largest (or other) motor. Once the motor is started, the booster section of the controls is of no further use until the largest motor starts again. By this principle, high starting torque by one or more motors operating on the rotary phase generator is accomplished.

Another aspect of this invention is the multi-stage rotary phase generator system. This system of the invention uses two or more rotating units connected in parallel and starting in te delay sequence. In this way the starting current of the rotating units may be reduced to a minimum of that of one of the rotating units, and the system may be any size.

Referring to FIG. 1, there is illustrated the circuit for the rotating unit which comprises a conventional 9 lead (1-9) 3 phase Wye connected stator winding of a 3 phase A-C induction motor. The 3 windings 1-Y, 2-Y, and 3-Y are connected together at a common point indicated at Y and can be connected to operate at either 230 or 460 volts A-C. The standard low resistance class B rotor is employed but is not shown. Reference is made to U.S. Pat. No. 4,513,237 for more information on 3 phase Wye connected windings. The windings are connected to a capacitor starting circuit 21, capacitor running ciruits 23 and 25, and a control circuit 27 for the starting circuit 21 to form a rotary phase generator for converting one phase power, applied from lines L1 and L2, to 3 phase power taken from L1, L2, and LG3. The circuits 21, 23, and 25 can be connected for either 230 or 460 volts operation.

For 230 volts, the connection of the 3 phase winding is L1 to 1 and 7, L2 to 2 and 8, and LG3 (manufactured phase) to 3 and 9. Leads 4, 5, and 6 are connected together.

The starting circuit 21 comprises circuits 21A and 21B each of which includes a starting capacitor 10 and a normally open contact 11. The running circuit 23 comprises circuits 23A and 23B each of which includes a running capacitor 12 (for example: 50 MFD, 370 v., oil-filled). The running circuit 25 comprises circuits 25A and 25B each of which includes a running capacitor 14. Any one capacitor symbol may represent a bank of capacitors of any number. Lead 29 connects circuits 21A, 21B, 23A and 23B together as shown and lead 31 connects circuits 25A and 25B together. A lead or switch 41 is connected to winding lead 1 and is adapted to be connected to terminal T1A which in turn is connected by lead 43 to lead 29. The other ends of circuits 21A and 23A are connected together at terminal T1B and the other ends of circuits 21B and 23B are connected together at terminal T1C. A jumper X1 is adapted to be connected to terminals T1B and T1C. A jumper X2 is adapted to be connected to terminals T2A and T2B of circuits 25A and 25B. A jumper X3 is adapted to be connected to terminals T1D and T2C of leads 29 and 31.

For 230 volt connection, switch 41 is connected to terminal T1A; jumper X1 is connected to terminals T1B and T1C; jumper X2 is connected to terminals T2A and T2B; and jumper X3 is connected to terminals T1D and T2C. The control circuit 27 is connected for 230 volt operation. With this connection, L1 is connected to point A (lead 29) by switch 41, terminal T1A, and lead 43 and then to capacitors 10 and 12 which are connected in parallel. By way of jumper X3, capacitors 14 also are connected in parallel with capacitors 10 and 12. Capacitors 10 (electrolytic starting capacitors) are connected separately in series with their contacts 11 and from contacts 11 to terminals T1B and T1C. Terminal T1C is connected by lead 45 to lead 3 of the winding of the rotating unit. By the connections of capacitors 10 and contacts 11, a starting circuit (from L1 to LG3) for the rotating unit is obtained. From point A, capacitors 12 are connected to T1B and T1C in separate circuits 23A and 23B. Jumper X1 connects terminals T1B and T1C together, which parallels contacts 11, and then to lead 3 of the winding of the rotating unit. By these connections, a running capacitor circuit is accomplished from L1 to LG3. From point A (by way of jumper X3) from terminal T1D to terminal T2C, capacitors 14 are connected in parallel with capacitors 10 and 12, to terminals T2A and T2B in separate circuits 25A and 25B. Jumper X2 connects terminals T2A and T2B together and by way of lead 47, capacitors 14 are connected in parallel to lead 2 of the rotating unit. By these connections, a running capacitor circuit is accomplished from L1 to L2. A 230 volt connection for the windings of the rotating unit, for the starting and running capacitors, and for the starting control circuit 27 is illustrated in FIG. 2.

Figure 4:
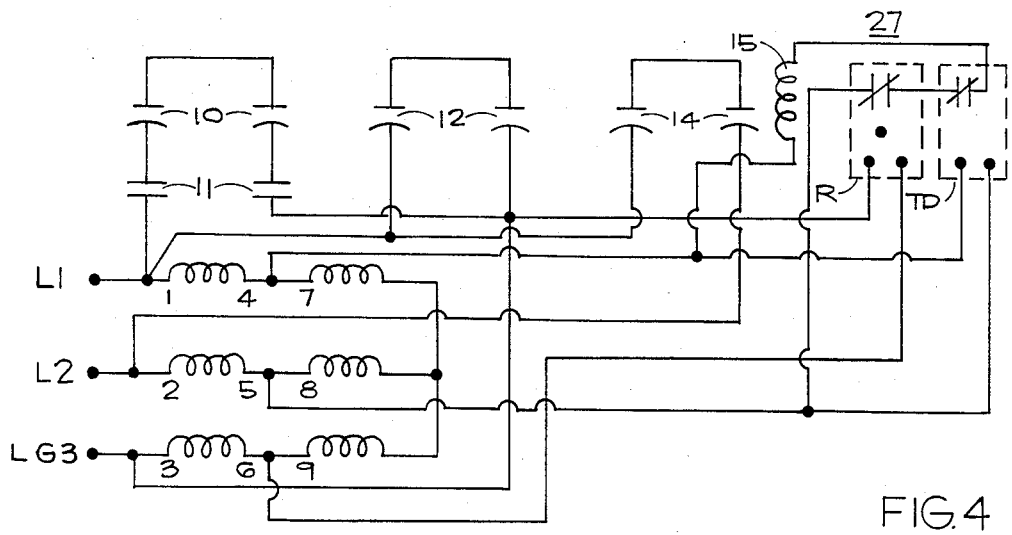
FIG. 4 illustrates the rotary phase generator of FIG. 1 connected to operate off of 460 volts single phase.

For 460 volts, the connections of the rotating unit are L1 to 1, L2 to 2, LG3 to 3. Connected together are leads 4 and 7, 5 and 8, and 6 and 9. For the starting and running circuit, jumper X1 is moved to connect terminals T1B and T2A. Lead or switch 41 is connected to terminal T1B and jumpers X2 and X3 are removed. Terminal T1A is open. By these connections, the capacitors and contacts are placed in series for 460 volt operation. In this respect, L1 and winding lead 1 are connected to T1B by way of lead 41, to contact 11 and to capacitor 10 in circuit 21A, to capacitor 10 and contact 11 of circuit 21B, to terminal T1C, and then by way of lead 45 to winding lead 3 and LG3. Running capacitors 12 are connected in series from L1 to LG3 and running capacitors 14 are connected in series from L1 to L2. FIG. 4 illustrates the connections of the windings of the rotating unit and of the contacts and capacitors for 460 volt operation.

Figure 2:
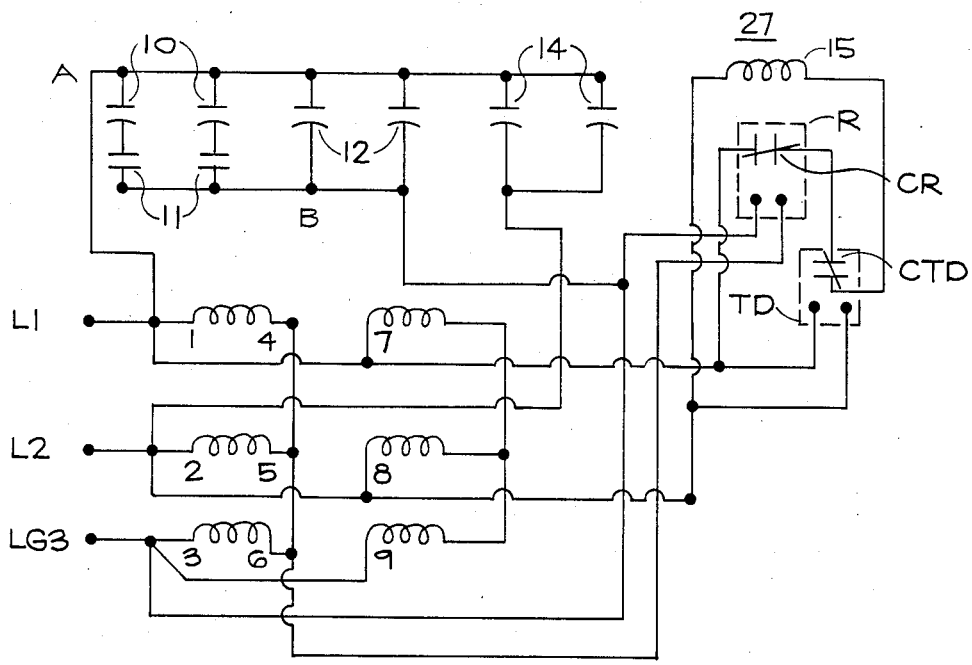
FIG. 2 illustrates the rotary phase generator of FIG. 1 connected to operate off of 230 volts single phase.

Referring to the starting circuit control system 27 in FIGS. 1, 2, and 4, the system comprises a coil 15, a voltage sensitive relay R, and a time delay relay TD. Relay R comprises normally closed contacts CR and time delay TD comprises normally closed contacts CTD. As shown in FIG. 1, normally closed contacts CR and CD are connected in series and with the coil 15 by way of lead 51 which extends from winding lead 7 to winding lead 8. Coil 15 is a solenoid coil for the magnetic contactor which operates normally open contacts 11. (When current is applied to coil 15, it closes normally open contacts 11.) The coil 15 is powered from leads 7 and 8 which have a voltage output of 230 volts whether the rotating unit is connected for 230 volts or 460 volts. The power leads of the time delay relay TD are also taken from this source by way of leads 53 and 55 which are connected to leads 51 as shown in FIG. 1. The voltage sensitive relay R takes its power source from windings leads 3 and 6 of the rotating unit. Connection is by way of leads 57 and 59. The power from winding leads 3 and 6 is counter EMF and varies directly with the RPM of the rotating unit. This counter EMF (voltage) will reach a maximum of about 115 volts if the line voltage is 230 or 460 volts. The voltage from winding leads 3 and 6 is the same regardless of the voltage connection of the rotating unit. The reason that the voltage is the same across these sources (7 and 8 is 230 volts and 3 and 6 is 115 volts) is because the voltage per turn of a dual voltage winding is the same regardless of the voltage connection. The voltage across these sources will vary only when line voltage (input) varies due to line drop, etc.

The sequence of action for both voltage connections (230 or 460 volts) is the same. One phase power is applied to L1 and L2. Voltage is applied to L1 and L2 and then to capacitors 10 (electroylic starting capacitors). Current will pass from point A to LG3, accomplishing an activated starting circuit for the rotating unit and the rotating unit will start. At the same time, voltage is applied to running capacitors 12 and 14 accomplishing running circuits from L1 to LG3 and from L1 to L2. The action of these components is described above. At the same time, as the rotating unit approaches full RPM, counter EMF (voltage) is applied to the voltage sensitive relay R causing it to actuate to open its normally closed contacts CR which opens the circuit to coil 15 at a predetermined RPM after initial start up. At the same time, voltage from winding leads 7 and 8 is applied to the time delay relay TD causing it to time out and to open its normally closed contacts CTD thereby opening the circuit to coil 15 in case the relay R fails. When the circuit of coil 15 is opened, contacts 11 will open and relieve the starting capacitors 10. Load then may be applied to the rotary phase generator.

In one embodiment, the voltage sensitive relay R may be the type disclosed in my U.S. Pat. No. 4,378,520. The time delay relay TD is a commercially available unit. The capacitance of running capacitors 12 across leads 1 and 3 may be 20 mf per H.P. and the capacitance of running capacitors 14 across leads 1 and 2 may be 10 mf per H.P.

Figure 3:
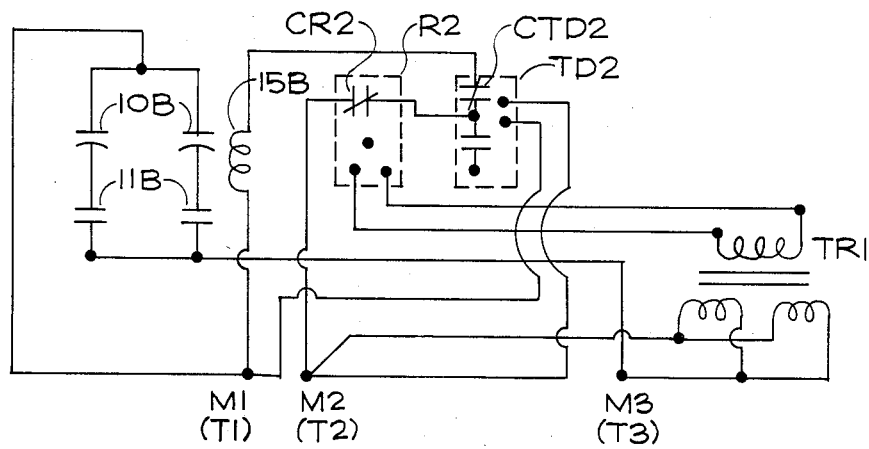
FIG. 3 is an electrical schematic of a booster control for use with the rotary phase generator as connected in FIG. 2 for providing high starting torque for a large motor.
Figure 8:
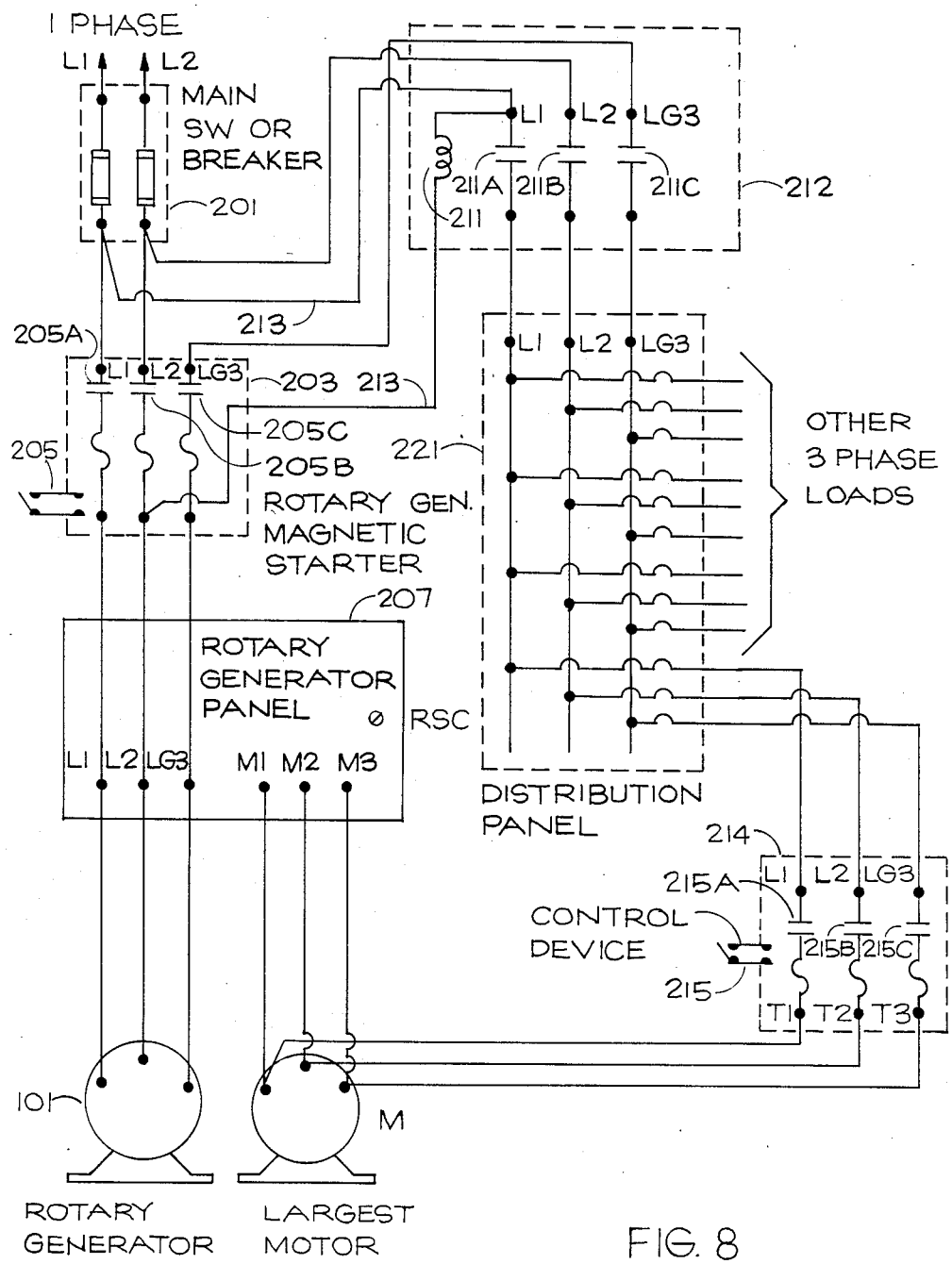
FIG. 8 illustrates a typical connection of a rotary phase generator with a booster control for the high starting torque for the largest motor. The wiring of a rotary phase generator without the booster control will be the same except that the terminals M1, M2, and M3, and the wiring from these terminals will be deleted.

Referring to FIG. 2, this Figure illustrates a single voltage rotary phase generator with its rotating unit and starting capacitors 10 and running capacitors 12 and 14 connected for 230 volt operation. Further connection information is illustrated in FIG. 8. In FIG. 3, a booster section is shown for use with the rotary phase generator of FIG. 2 to start the largest (or other) motor.

As this motor comes on the line it will start with high torque. The torque is comparable to the starting torque that this motor would have on standard 3 phase power. In addition the largest (or other) amount in KVA that the total H.P. of the rotating unit and this motor would produce if the rotating unit was a motor equal to the total H.P. of both the motors. FIG. 9 illustrates a multi-stage rotary phase generator system in which this principle is shown. It will be explained subsequently.

The control system 27, comprises voltage sensitive relay R, time delay relay TD and coil 15. Coil 15 is the solenoid coil for contacts 11. Its purpose is to close these contacts for the starting circuit of the rotating unit. Voltage sensitive relay R and time delay relay TD control this action. Relay R is powered from leads 3 and 6 of the rotating unit. This source is counter EMF and RPM responsive. The relay R may be adjusted electrically and mechanically to actuate at various levels, and can be made to actuate at the desired RPM. Time delay relay TD is adjustable in time from 1 to 10 seconds. It is used to back up voltage sensitive relay R. In case relay R fails to actuate, relay TD will then actuate and relieve the starting capacitors. The starting capacitors (electrolytic) will not tolerate being across voltage but a few seconds, or they will break down. For example: If the bearings should seize in the rotating unit. Since the voltage sensitive relay R is responsive to RPM it would not actuate, but the time delay relay TD would actuate because the voltage source of relay TD is secondary leads 7 and 8. This source is 230 volts even if the rotating unit is stalled (less line voltage drop). This system is very dependable. The voltage source from leads 3 and 6, which operates relay R, will be about 115 volts at full RPM.

Referring to FIG. 2, the sequence of operation of the rotating unit is as follows. Voltage is applied to L1 and L2, to point A (by way of lead 41) and to capacitors 10, 12, and 14. At the same time, voltage is received by coil 15, by way of lead 8, normally closed contacts CTD of relay TD, normally closed contacts CR of relay R, and lead 7. This causes contacts 11 to close, and allows voltage to pass to point B and to LG3. This completes the starting circuit of the rotating unit. Since voltage has been applied to L1 and L2, current will pass through the starting and running circuits and the rotating unit will start. Phases 1 and 2 act as a running winding, and phase 3 acting as a starting winding. As the rotating unit reaches full RPM, counter EMF from leads 3 and 6 will reach a point that voltage sensitive relay R will actuate. This will de-energize coil 15, allowing contacts 11 to open, and relieve starting capacitors 10. At the same time voltage is received at point A, to running capacitors 12 and 14 to point B, to L2 and L3.

The booster control of FIG. 3 is a modified static converter integrated into, and is a part of the control panel of the rotating unit. Capacitors 10B are starting capacitors (electrolytic). Normally open contacts 11B relieve these starting capacitors. Coil 15B is the solenoid coil for contacts 11B. Relay R2 is a voltage sensitive relay. It is supplied from transformer TR1, which has a primary source from terminals M2T2 and M3T3, and is counter EMF and RPM responsive. The primary supply of transformer TR1 reaches a voltage of about 230 volts at full RPM of the largest (or other) motor. Voltage sensitive relay R2 requires a voltage of 115 volts and transformer TR1 supplies this potential. Time delay relay TD2 is supplied from terminals M1T1 and M2T2, which is (230 v.) L1 and L2 after the largest motor is energized. The booster control including terminals M1T1, M2T2, and M3T3 will be explained further in the description of FIG. 8.

Figure 5:
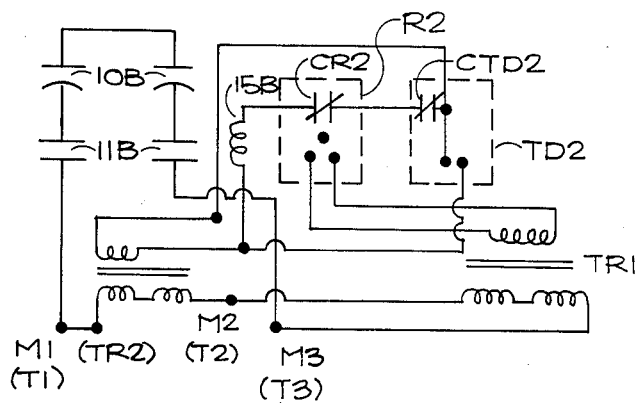
FIG. 5 is an electrical schematic of a booster control connected for use with the rotary phase generator as connected in FIG. 4 for providing high starting torque for a large motor.

Referring to FIG. 4, this Figure illustrates a single voltage rotary phase generator with its rotating unit and starting capacitors 10 and running capacitors 12 and 14 connected for 460 volt operation. Further information is illustrated in FIG. 8. In FIG. 5, a booster section is shown for use with the rotary phase generator of FIG. 4 to start the largest (or other) motor.

The control system 27 comprises voltage sensitive relay R, time delay relay TD and coil 15. These components operate in the same manner as described in 230 volt rotating units. Coil 15 is connected to leads 7 and 8 which is always a 230 volt source. Relay R is a voltage sensitive relay and is connected to leads 3 and 6. This supply is counter EMF and RPM responsive, and reaches a maximum of about 115 volts at full RPM of the rotating unit. Time delay relay TD is rated at 230 volts and is connected to leads 7 and 8, which is always a 230 volt source.

The principle of operation of the booster control of FIG. 5 is the same as described in conjunction with FIG. 3. The difference is that the design of the booster control of FIG. 5 is for 460 volts and contacts 11B are in series in such a manner as to be correct for 460 volts. Solenoid coil 15B and time delay relay TD2 require a 230 volt supply. This is supplied by transformer TR2, which is connected for 460/230 volts. Voltage sensitve relay R2 is supplied from transformer TR1 which gets its primary voltage from T2 and T3 of the largest (or other) motor. This voltage will reach a maximum of about 460/480 volts if the line voltage is 460 volts. Transformer TR1 is connected for 460/115 volts. The relay R2 requires a voltage of 115 volts (counter EMF - RPM responsive). By these connections the components of the booster control are supplied with the correct voltage.

Figure 6:
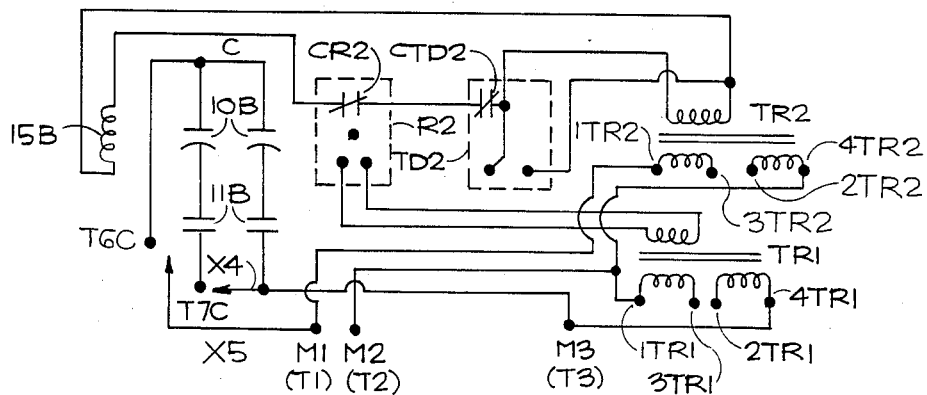
FIG. 6 is an electrical schematic of a dual voltage booster control which can be connected to operate off of 230 volts or 460 volts.

Referring to FIG. 6, there is illustrated a dual voltage booster control for use with the dual voltage rotary phase generator of FIG. 1. The controls are integrated into one control panel. The purpose of this control is to cause the largest motor, or any one motor, to start with high torque. Further connection information is shown on FIG. 8. The booster is a modified dual voltage static phase converter. It can be connected for either 230 or 460 volt operation as described in conjunction with FIGS. 3 and 5.

In the connection of the booster control of FIG. 6 to the system of FIG. 8, M1, M2, and M3 are connected to T1, T2, and T3 of the largest motor M, (or other). For 230 volt connection, jumper X5 is connected to terminal T6C, and jumper X4 is connected to terminal T7C. Transformer TR1 is connected for 230/115 volts by connecting together leads 1TR1 and 2TR1 and leads 3TR1 and 4TR1. Transformer TR2 is connected for 230/230 volts by connecting together leads 1TR2 and 2TR2 and leads 3TR2 and 4TR2. When the motor is energized M1T1 electrically connects to L1 and M2T2 electrically connects to L2. See FIG. 8 for T1, T2, and T3 of the largest motor. The circuit is then from L1 to terminal T6C (by jumper X5), to parallel point C, to starting capacitors 10B, to contacts 11B, (in separate circuits) to terminal T7C (both circuits parallel at this point by jumper X4), to M3T3. These connection accomplish a starting circuit from M1/T1/L1 to M3/T3 which is correct for 230 volts.

The control components of the booster system of FIG. 6 comprise solenoid coil 15B, voltage sensitive relay R2, time delay relay TD2, transformer TR2, and transformer TR1. Transformer TR2 supplies a voltage of 230 volts for the solenoid coil 15B which requires a 230 volt supply. This coil when energized closes normally open contacts 11B. This coil circuit starts at transformer TR2, to solenoid coil 15B, to normally closed contacts CR2 of voltage sensitive relay R2, to normally closed contacts CTD2 of time delay relay TD2, and to transformer TR2. These connections accomplish a control circuit for solenoid coil 15B which is correct for 230 volts. Voltage sensitive relay R2 is supplied from transformer TR1. This is a counter EMF source which is responsive to RPM. The voltage of this source reaches a maximum of about 115 volts at rated RPM of the motor which is being operated. The point at which the voltage sensitive relay R2 will actuate is mechanically and electrically adjustable. The voltage sensitive relay R2 requires a voltage source of 115 volts. When the relay R2 actuates it's normally closed contacts CR2 open to open the circuit to the solenoid coil 15B. This allows contacts 11B to open to relieve the capacitors 10B. Voltage sensitive relay R2 is backed by time delay relay TD2. Time delay relay TD2 requires a 230 volt source which is supplied by transformer TR2. This relay TD2 is adjustable from 1 to 10 seconds in time. If for any reason voltage sensitive relay R2 does not actuate correctly, time delay relay TD2 will then actuate and open the circuit to solenoid coil 15B. The sequence of actions in these circuits is as follows: Power is applied to the largest motor M (see FIG. 8). M1T1 and M2T2 receive the same 1 phase power as is supplied to the rotary phase generator. Transformer TR2 receives power and solenoid coil 15B receives power from TR2 which causes contacts 11B to close. This action connects the starting capacitors 10B from L1/M1/T1 to M3/T3, starting the motor M with high torque. As the motor nears full RPM, voltage from transformer TR1 (counter EMF) will cause voltage sensitive relay R2 to actuate and open the circuit to coil 15B, which causes contacts 11B to open, disconnecting starting capacitors 10B from L1/M1/T1 to M3/T3. Since they will disintegrate if left energized longer than a few seconds (max.

7/10), it is essential that the best possible system be used for this purpose. If voltage sensitive relay R2 fails to actuate, time delay relay TD2 will then actuate and open this control circuit. This system is very dependable.

For 460 volt connection of the booster control of FIG. 6, jumper X5 is moved from terminal T6C to terminal T7C. Jumper X4 is opened and insulated. Transformer TR1 is connected for 460/115 by connecting together leads 2TR1 and 3TR1. Transformer TR2 is connected for 460/230 by connecting together leads 2TR2 and 3TR2. When the motor (being operated) is energized, M1/T1 electrically connects to L1 and M2/T2 electrically connects to L2. The circuit is from L1 to T7C, to contact 11B, to starting capacitor 10B, to point C, to second starting capacitor 10B, to second contacts 11B, and to M3/T3. By these connections, the contact and capacitors are placed in series in such a manner that a starting circuit is accomplished which is correct for 460 volts. By changing the connection of transformer TR2 to 460/230 the control circuit remains 230 volts. By changing the connection to transformer TR1 to 460/115 the counter EMF voltage remains 115 volts. The sequence of action is the same as for the 230 volt connection.

Figure 7:
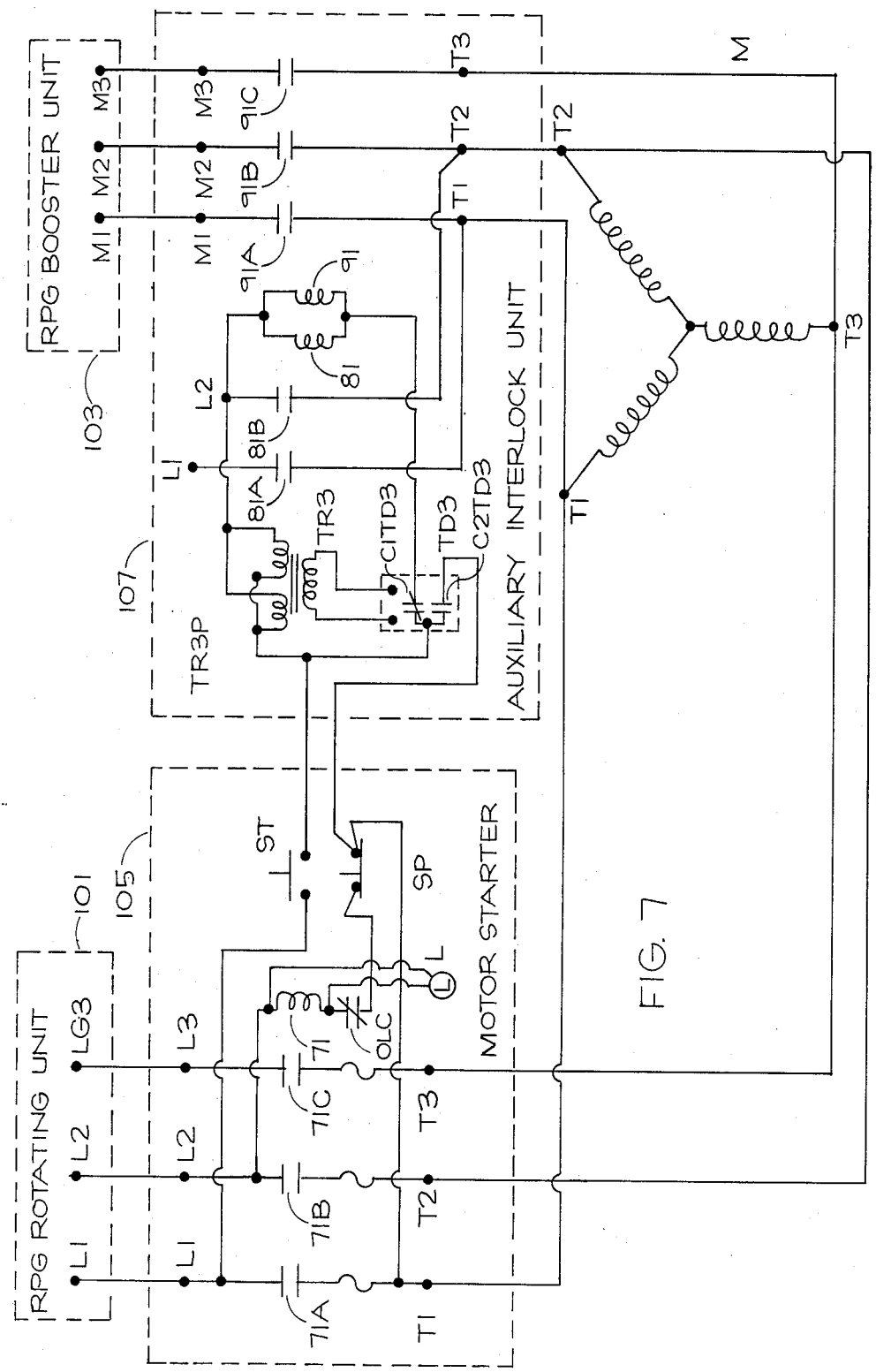
FIG. 7 is an electrical schematic of an auxiliary interlock control designed to lock out the rotary phase generator until the largest (or other) load motor has started and has reached full rpm. This auxiliary interlock control may be used on those rotary phase generators which have a booster control for high starting torque and works in conjunction with the booster control. The auxiliary interlock control relieves the rotary phase generator from the heavy starting current in cases where there is a voltage drop problem, for example a large motor starting and stopping at short intervals.

Referring to FIG. 7, there is illustrated an auxiliary interlocking system. The purpose of this system is to cause the largest or any large motor to start on the booster control system and to transfer to the rotating unit of the rotary phase generator after the motor has started. The reason for operating a large motor in this way is to eliminate the starting shock of the motor to the rotating unit of the rotary power generator which may cause a temporary voltage drop to other motors in operation while this large motor is starting. An example of a large motor which may be started with the use of the auxiliary interlocking system is a large air compressor which starts and stops intermittently.

In FIG. 7, reference numeral 101 identifies the rotating unit of a rotary phase generator; reference numeral 103 identifies a booster unit of the type shown in FIGS. 3, 5, and 6; reference numeral 105 identifies a motor starter; reference numeral 107 identifies the auxiliary interlocking system; and M identifies the three phase windings of a large A-C motor to be started. The motor starter 105 comprises three normally open switches 71A, 71B, and 71C which are closed by a coil 71 when energized; normally closed overload contacts OLC; a light L connected across coil 71; a normally open switch ST; and a normally closed switch SP. Switches ST and SP are manually operated however it is to be understood that they could be operated automatically in various ways such as by pressure switching, timing devices, etc.

The interlocking system 107 comprises a transformer TR3; a time delay relay TD3 having normally closed contacts C1TD3 and normally open contacts C2TD3; normally open contacts 81A and 81B which are closed by a relay coil 81 when energized; and normally open contacts 91A, 91B, and 91C which are closed by a relay coil 91 when energized.

In operating the system of FIG. 7 to start the motor M, switch ST is closed. This provides a circuit from L1 of the motor starter 105 to L2 of the system 107 by way of closed switch ST, to one side of the primary TR3P of the transformer TR3, and to the other side of the primary TR3P to L2. This circuit provides a primary voltage for transformer TR3 for furnishing a voltage to the time delay relay TD3 as long as the start stop switch ST is manually closed. At the same time, a circuit is completed to the common point of the contacts C1TD3 and C2TD3 of the time delay relay TD3, to the two solenoid coils 81 and 91 (by way of normally closed contact C1TD3 of the time delay relay TD3) and to L2 of the system 107. This connection causes contacts 81A, 81B, and 91A, 91B, and 91C to close applying power to T1 and T2 of the motor M; and connecting T1, T2, and T3 of the motor to M1, M2, and M3 of the booster unit. The motor then will start with high torque off of the booster system.

The switch ST is maintained closed until the pilot light L comes on. This indicates that the time delay relay TD3 has timed out and the motor starter has actuated. When the time delay relay TD3 times out, contacts C1TD3 open and contacts C2TD3 close. When contacts C1TD3 open. coils 81 and 91 are deenergized resulting in contacts 81A, 81B and 91A, 91B, and 91C opening. When contacts C2TD3 close, current flows through the solenoid coil 71 by way of switch ST, closed contacts C2TD3, closed switch SP, normally closed switch OLC, coil 71, and L2. This results in switches 71A, 71B and 71C closing whereby power is applied to T1, T2, and T3 of the motor from L1, L2, and LG3 of the rotating unit of the rotary phase generator. When the motor starter actuates and switches 71A, 71B, and 71C close, a circuit is completed from T1 to L2 of the motor starter until shut down. This circuit is from T1, of the motor starter, normally closed switch SP, normally closed contacts OLC, coil 71, and L2. At the same time, another circuit starts at T1 of the motor starter, to the normally open contacts C2TD3 of the time delay relay TD3 (which are closed as soon as the time delay relay TD3 times out), to one side of the primary of the transformer TR3, and then to L2. This provides an alternate circuit from L1 of the motor starter to the primary of transformer TR3, which is maintained through the time delay relay TD3 after the start/stop switch ST is manually released and the circuit from L1 through the start/stop switch ST becomes open. This circuit keeps the normally open contacts C2TD3 closed and the normally closed contacts C1TD3 open to keep contacts 81A, 81B, 91A, 91B and 91C open. The time delay relay TD3 requires a power source of 115 volts. This is supplied by transformer TR3.

By these connections and components, the auxiliary interlock system operates which removes the starting shock from the rotary phase generator when conditions exist which are detrimental to the system when large motors are starting on the system.

The system of FIG. 7 is connected to operate off of 230 volts. In order to operate this system off of 460 volts, the primary of the transformer TR3 is connected such that the two windings of the primary are in series and the coils 71, 81, and 91 will be replaced with different coils capable of operating off of 460 volts.

Referring now to FIG. 8, there are illustrated line leads L1 and L2 for single phase voltage extending to the main switch or breaker 201 and then to a rotary generator magnetic starter 203 comprising normally open contacts 205A, 205B, and 205C which can be controlled and closed by a control device 205 when actuated. From the starter 203, leads L1, L2, and LG3 extend to a panel 207 and then to a rotary phase generator 101 of the type illustrated in FIGS. 1, 2, and 4. From the breaker 201, leads L1 and L2 extend to normally open contacts 211A and 211B (of a main magnetic contactor 212) which are controlled by a coil 211 which is connected from L1 at contactor 212 to L2 at the starter 203 by way of lead 213. From starter 203, LG3 extends to normally open switch 211C at the contactor 212 which also is controlled by the coil 211. From the contactor 212, the leads L1, L2 and LG3 extend to a distribution panel 221 where 3 phase voltages are taken off for other 3 phase loads by way of the 4 sets of 3 leads shown. The lower set of 3 leads L1, L2, and LG3 extend to a starter device 214 and to 3 normally open contacts 215A, 215B, and 215C, respectively which are controlled by a control device 215. From the starter device 214, the leads L1, L2, and LG3 extend to terminals T1, T2, and T3 which in turn are coupled to corresponding terminals of the largest motor M to be started. At the panel 207, terminals M1, M2, and M3 extend to the corresponding terminals T1, T2, and T3 of the largest motor M. If the booster controls of FIGS. 3, 5, or 6 are to be employed, their terminals M1, M2, and M3 will be connected to the corresponding terminals T1, T2, and T3 of the motor. When the control device 205 is actuated, switches 205A, 205B, and 205C are closed thereby energizing the coil 211 which in turn causes the normally open contacts 211A, 211B, and 211C to close whereby when the rotary generator 101 begins operation and 3 phase voltage is applied to the distribution panel 221 to be taken off for other 3 phase loads. When the control device 215 is actuated, normally open switches 215A, 215B, and 215C will be closed applying 3 phase voltage to T1, T2, and T3 of the motor M and allowing the booster control to start the largest motor M. Once it is started motor M will be operated off of the 3 phase voltage produced by the rotary phase generator. By employing the booster control as described, a smaller motor for the rotary phase generator can be employed to start a larger motor of a customer. Thus, the capacity of the rotary phase generator system is increased with a booster control and a smaller size motor may be employed in the rotary phase generator which reduces the cost. Although not shown, the interlock system of FIG. 7 can be employed in the system of FIG. 8.

Referring now to FIG. 9, there will be described the multi-stage rotary phase generator system. It is designed to lower the starting line shock on the power system supplying single phase power to the rotating unit of the rotary phase generator. In rural areas voltage drop is usually a problem, and the starting of a large single phase rotating unit may be undesirable or impossible. According to this aspect of the invention, a rotary phase generator can be built with 2 or more smaller rotating units connected in parallel, and started in time delay sequence. For example, for a rotary phase generator requiring a 150 H.P. rotating unit, three 50 H.P. rotating units may be connected in parallel to obtain the same output as a 150 H.P. rotating unit, and the starting current will never be any greater than that of one 50 H.P. unit. In cases where the power source will not tolerate even the starting of one 50 H.P. unit, it is possible to use even smaller units in parallel. Also these rotating units which are connected in parallel do not necessarily need to be the same size. They may be any size which is required for the correct KVA. This principle makes possible the starting of rotary phase generators of any size without intolerable line shock.

In FIG. 9, there are illustrated three rotary phase generators 1R, 2R, and 3R. The rotary generator 1R may be the same as that shown in FIGS. 1, 2, and 4 with or without the booster controls as shown in FIGS. 3, 5, and 6. The rotating units of the rotary phase generators R2 and R3 will have running capacitors only since they will have been started from the 3 phase output of rotary phase generator 1R. The rotating units of the rotary phase generators R2 and R3 may be the same as that shown in FIGS. 12 and 13 depending whether they are operated off of 230 volts or 460 volts.

In FIG. 9, lead lines L1 and L2 provide one phase voltage. Also shown is lead line LG3. The rotary phase generators 1R, 2R, and 3R are connected in parallel to L1, L2, and LG3 to provide 3 phase voltage output. The main lead lines L1, L2, and LG3 are connected to the rotary phase generator 1R by way of circuit breaker 241, motor starter 243, and panel 249; to rotary phase generator 2R by way of circuit breaker 261, motor starter 263, and rotary generator panel 269; and to rotary phase generator 3R by way of circuit breaker 281, motor starter 283, and rotary generator panel 289. The motor starter 243 comprises normally open contacts 243A, 243B, and 243C which are closed by a coil 244 when actuated by closing a starting device 245. The coil 244 is connected by lead 246 to L2 of the circuit breaker 281 and the starting device 245 is connected by lead 247 to L1 of the circuit breaker 261. The starter 263 comprises three normally open contacts 263A, 263B, and 263C which are closed by a coil 264 when energized by a time delay relay TD4. Relay TD4 includes normally open contacts CTD4. Relay TD4 is connected to leads 1 and 4 of the windings of the rotary phase generator 1R and hence is energized by the voltage across these leads. Contacts CTD4 and coil 264 are connected in series and to L1 and L2 at starter 263. Starter 283 comprises normally open contacts 283A, 283B, and 283C which are closed by a coil 284 when energized. A time delay relay TD5 is provided and comprises normally open contacts CTD5. Relay TD5 is coupled to leads 1 and 4 of the rotary phase generator 2R and hence is energized by the voltage across these leads. Contacts CTD5 and coil 284 are connected in series and to L1 and L2 at starter 283.

The main rotating unit of rotary phase generator 1R is energized from L1 and L2 by closing the motor rated breakers 241 and by closing the starting device 245. This starting device may be controlled manually, by a time clock, radio signal, or a combination of these devices or other arrangements. When the starting device 245 is closed, coil 244 closes contacts 243A, 243B, and 243C and the main rotating unit of the rotary phase generator 1R will start.

The rotating units of rotary phase generators 2R and 3R is more simplified than that of 1R and has running capacitors only. The capacitors are essentially for power factor correction since the units will start and run on the 3 phase power produced by the main rotating unit 1R.

As the main rotating unit 1R starts, voltage is received from leads 1 and 4 of 1R to the time delay relay TD4 and it begins to time out. When it times out, contacts CTD4 close causing coil 264 to close contacts 263A, 263B, and 264C. The rotating unit of rotary phase generator 2R then will start and is in parallel with the unit 1R. The time delay of relay TD4 is adjustable.

The rotary phase generator 3R is of the same type as generator 2R although it is not necessarily the same size. When generator 2R starts, the time delay relay TD5 will receive voltage from 1 and 4 of generator 2R and will begin to time out. When it times out, contacts CTD5 close causing coil 284 to close contacts 283A, 283B, and 283C. The generator 3R then will start and will be in parallel with the generators 1R and 2R. With these connections and components, a multi-stage rotating phase generator system is accomplished and the outputs from each of the generators 1R, 2R, and 3R are additive in KVA.

Referring to phase generators 1R and 2R, the supply of voltage from their leads 1 and 4 for TD4 and TD5 is 115 volts whether the units are connected for 230 volts or 460 volts. The time delay relays TD4 and TD5 are commercially available and operate off of 115 volts. All of the units 1R, 2R, and 3R may be made to operate from either 230 volts or 460 volts by using components rated for that voltage and by connecting the motors used in the rotating units for that voltage. The components supplied from leads 1 and 4, however, always need a supply og 115 volts.

Due to the connection of the motor starter 243 to the circuit breaker 261 and 281 by way of leads 246 and 247, if either of these circuit breakers 261 or 281 does out due to overload, it will cause its rotary phase generator to shut down as well as the other two rotary phase generators to shut down.

Referring to FIG. 10, there is illustrated a power factor correction device in the multi-stage phase generator system. The power factor correction device comprises a power factor sensing relay PFC which has normally open contacts CPFS in series with the normally open contacts CTD5 of the time delay relay TD5. Also provided is a coil 291 coupled to L2. Both contacts CPFS and CTD5 must close before the rotary phase generator 3R will start. Any number of stages may be controlled in this manner. Contacts CPFS will not close until the power factor as sensed by coil 291 and relay PFS is correct. There are available power factor relays which will actuate several stages as they are needed to maintain a pre-determined power factor, using only one relay. In this system, a multi-stage rotary phase generator system is used for both power factor correction and as a phase generator.

Referring to FIG. 11, there is provided a current sensitive relay CSR which is employed to add the second and third stages 2R and 3R to the system automatically as the load increases. Any number of stages may be controlled in this manner. The current sensitive relay CSR comprises normally open contacts 293 in series with the contacts CTD4 of the time delay relay TD4 and normally open contacts 295 in series with the contacts CTD5 of time delay relay TD5. Also provided is a coil 297 coupled to L2. The normally open contacts 293 and 295 of relay CSR close in a sequence which will start the phase generator 2R and the phase generator 3R as the load is increased. The sequence is as follows. The phase generator 1R is started. The time delay relay TD4 actuates for the generator 2R to start, but it will not start until enough load comes on the system to actuate and close the contacts 293 of the current sensing relay CSR. As the load increases, contacts 293 will close, starting the phase generator 2R. Now the time delay relay TD5 will actuate for the phase generator 3R to start, but it will not start until enough load comes on the system to actuate contacts 295 of the current sensing relay CSR. As the load is removed, the generators 3R and 2R will stop in a reverse sequence. With this system, a multiple stage phase generator system is accomplished in which the stages are added automatically as the load is increased and are removed automatically as the load decreases. The current sensing relay CSR is available commercially.

Figure 13:
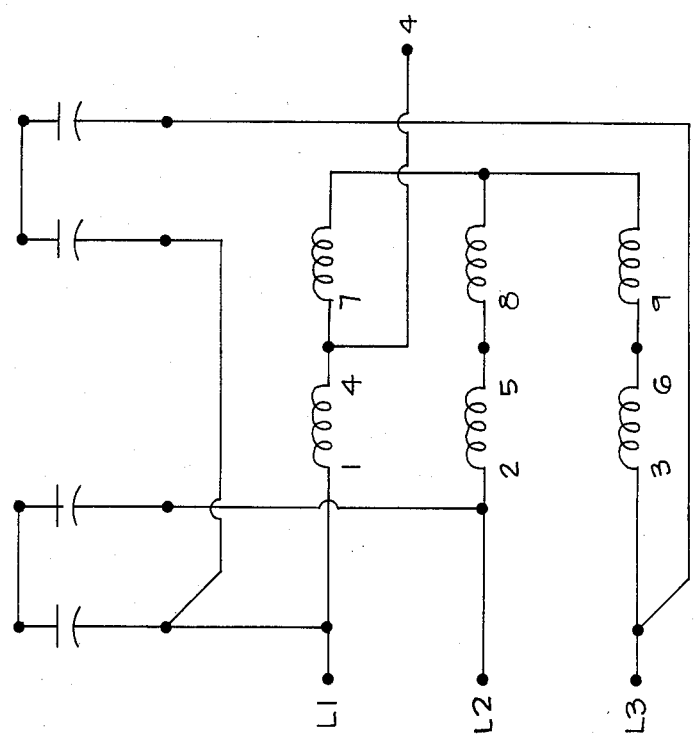
FIG. 13 is an electrical schematic of a rotary phase generator used as the 2nd and 3rd rotary phase generators of FIGS. 9, 10, and 11 connected to operate off of 460 volts.
Figure 12:
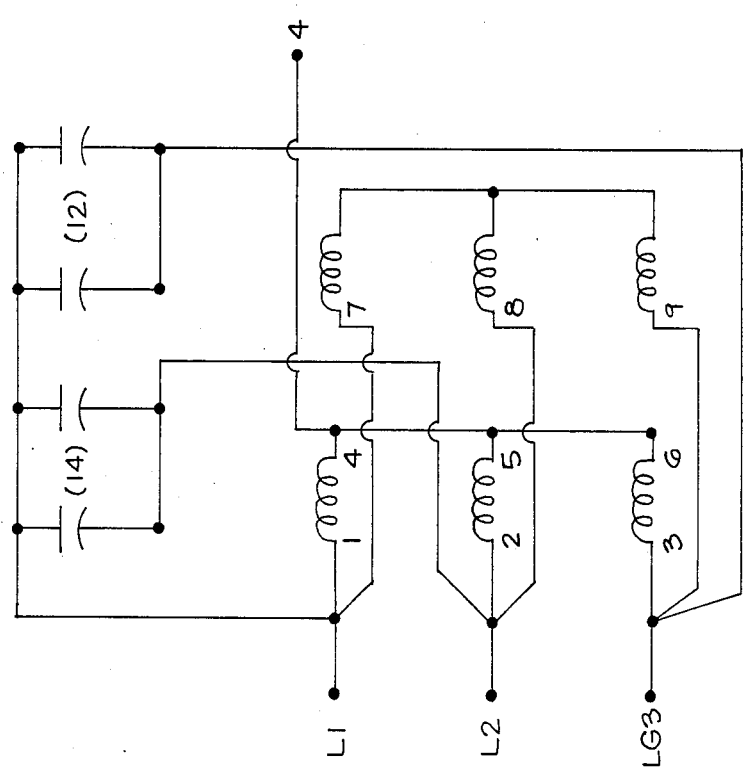
FIG. 12 is an electrical schematic of a rotary phase generator used for the 2nd and 3rd rotary phase generators of FIGS. 9, 10, and 11 connected to operate off of 230 volts.

Referring to FIGS. 12 and 13, there are illustrated the windings employed for the rotary phase generators 2R and 3R depending upon whether they are connected for 230 volts or 460 volts. The windings of FIG. 12 are connected for 230 volts volts and the windings of FIG. 13 are connected for 460 volts. Since the generators 2R and 3R start in time delay sequence, they start on the 3 phase power produced by the main rotary phase generator 1R and do not need starting capacitors, relay systems, etc. The running capacitors are for the purpose of maintaining the balanced voltage on the capacitor phase and power factor correction.

Although the windings of the rotary phase generators disclosed are shown as Wye connected, it is to be understood that the windings could be connected in a delta configuration instead.

I claim:

1. A rotary phase generator for generating a three phase voltage output from a single phase voltage input, comprising:
    an A-C motor having first, second, and third stator windings connected in the given configuration,
    first, second, and third leads connected to said first, second, and third stator windings respectively,
    said first and second leads being adapted to have a single phase line voltage applied thereto,
    said first, second, and third stator windings being connectable for line voltages of first or second levels,
    a starting circuit comprising first and second circuits, each comprising starting capacitor means and contact means,
    a running circuit comprising two groups of running capacitor means, each group comprising first and second circuits each of which comprises a capacitor means,
    the capacitance of said two groups of running capacitor means of said running circuit being different from each other,
    one end of each of said first and second circuits of said starting circuit and of one of said groups of running capacitor means being connected together by a first common lead,
    one end of each of said first and second circuits of the other group of running capacitor means being connected together by a second common lead,
    the other ends of said first circuits of said starting circuit and of said one group of running capacitor means being connected together,
    the other ends of said second circuits of said starting circuit and of said one group of running capacitor means being connected together,
    the other end of one of said circuits of said one group of running capacitor means being connected to said third stator winding,
    the other end of one of said circuits of the other group of running capacitor means being connected to said second stator winding.,
    a starting circuit control means coupled to said stator windings for causing said contact means of said starting circuit to close for starting said A-C motor and then to open after said A-C motor starts, to disconnect said starting capacitor means,
    a dual voltage control means for connecting said starting circuit and said running circuit in a manner to allow said motor to operate on line voltages of first or second voltage levels for producing three phase voltage outputs of said first or second voltage levels at said first, second, and third leads, comprising:
first means connectable from said first stator winding to either said first common lead or to the other end of said first circuit of said starting circuit,
second means being connectable to the other ends of said first and second circuits of said starting circuit,
third means being connectable to said first and second common leads, and
fourth means being connectable to the other ends of said first and second circuits of said other group of running capacitor means.

2. The rotary phase generator of claim 1, wherein said starting circuit control means comprises:
a voltage sensitive relay and a coil for controlling said contact means of said first and second circuits of said starting circuit,
said voltage sensitive relay comprising a relay contact means,
a time delay apparatus comprising a time delay contact means,
said voltage sensitive relay being connected to said stator windings,
said time delay apparatus being connected to said stator windings,
an electrical lead connected from one of said stator windings to another of said stator windings and including said relay contact means, said time delay contact means, and said coil,
said voltage sensitive relay being sensitive to the voltage produced at said stator windings for actuating said relay contact means for controlling power through said coil for causing said contact means of said starting circuit to open as the voltage at said stator windings increases to a given level after said motor begins to operate,
said time delay apparatus being actuated after a given time that power is applied to said motor for controlling its time delay contact means for controlling power through said coil for causing said contact means of said starting circuit to open in the event that said voltage sensitive relay fails.

3. A rotary phase generator for generating a three phase voltage output from a single phase voltage input comprising:
an A-C motor having first, second, and third stator windings connected in a given configuration,
first, second, and third leads connected to said stator windings,
said first and second leads being adapted to have a single phase voltage applied thereto,
a starting circuit comprising starting capacitor means and contact means coupled to said stator windings for starting said motor,
a running circuit comprising running capacitor means coupled to said stator windings for running said motor and for causing three phase voltage to be produced at said first, second, and third leads,
a starting circuit control means coupled to said stator windings for causing said contact means of said starting circuit to close for starting said A-C motor and then to open after said A-C motor starts, to disconnect said starting capacitor means,
said starting circuit control means comprising:
a voltage sensitive relay and a coil for controlling said contact means of said starting circuit,
said voltage sensitive relay comprising a relay contact means,
a time delay means comprising a time delay contact means,
an electrical lead having two ends connected to said stator windings and including said relay contact means, said time delay contact means, and said coil connected in series,
said voltage sensitive relay being connected to a winding portion of said stator windings which produces a voltage when said motor begins to operate, which is dependent upon the RPM of said motor,
said voltage sensitive relay being sensitive to the voltage produced at said winding portion for actuating said relay contact means for controlling power through said coil for causing said contact means of said starting circuit to open as the voltage at said winding portion increases to a given level after said motor beings to operate,
said time delay means being connected to winding means of said stator windings which produces a voltage, when power is applied to said motor, which is independent of the RPM of said motor,
said time delay means being actuated after a given time that power is applied to said motor for controlling its time delay contact means for controlling power through said coil for causing said contact means of said starting circuit to open in the event that said voltage sensitive relay fails.

4. A rotary phase generator for generating a three phase voltage output from a single phase voltage input comprising:
an A-C motor having first, second, and third stator windings connected in a given configuration,
first, second, and third leads connected to said stator windings,
said first and second leads being adapted to have a single phase voltage applied thereto,
a starting circuit comprising starting capacitor means and contact means coupled to said stator windings for starting said motor,
a running circuit comprising two groups of running capacitor means coupled to said stator windings for running said motor and for causing three phase voltage to be produced at said first, second, and third leads,
one of said two groups of running capacitor means being connected to said first and third stator windings and the other of said two groups of running capacitor means being connected to said first and second stator windings,
the capacitance of said two groups of running capacitor means of said running circuit being different from each other, and
a starting circuit control means coupled to said stator windings for causing said contact means of said starting circuit to close for starting said A-C motor and then to open after said A-C motor starts, to disconnect said starting capacitor means.

5. The rotary phase generator of claim 4 wherein said starting circuit control means comprises:
a voltage sensitive relay and a coil for controlling said contact means of said starting circuit,
said voltage sentitive relay comprising a relay contact means, a time delay means comprising a time delay contact means, an electrical lead having two ends connected to said stator winding and including said relay contact means, said time delay contact means, and said coil, said voltage sensitive relay being connected to a winding portion of said stator windings which produces a voltage when said motor begins to operate, which is dependent of the RPM of said motor, said voltage sensitive relay being sensitive to the voltage produced at said winding portion for actuating said relay contact means for controlling power through said coil for causing said contact means of said starting circuit to open as the voltage at said winding portion increases to a given level after said motor begins to operate, said time delay means, being connected to winding means of said stator windings which produces a voltage, when power is applied to said motor, which is independent of the RPM of said motor, said time delay means being actuated after a given time that power is applied to said motor for controlling its time delay contact means for controlling power through said coil for causing said contact means of said starting circuit to open in the event that said voltage sensitive relay fails.

6. The rotary phase generator of claim 4, wherein said starting circuit control means comprises:

voltage sensitive means connected to a winding portion of said stator windings which produces a voltage when said motor beings to operate, which is dependent upon the RPM of said motor, said voltage sensitive means causing said contact means of said starting circuit to open as the voltage at said winding portion increases to a given level after said motor begins to operate, and time delay means connected to winding means of said stator windings which produces a voltage, when power is applied to said motor, which is independent of the RPM of said motor, said time delay means causing said contact means of said starting circuit to open at a given time after power is applied to said motor in the event that said voltage sensitive means fails.

7. A system for starting and operating a three phase work producing A-C motor having three stator windings coupled together in a given configuration, comprising:

a rotary phase generator for generating a three phase voltage output from a single phase voltage input comprising:

an A-C motor having first, second, and third stator windings connected in a given configuration, first, second, and third leads connected to said stator windings, said first and second leads being adapted to have a single phase voltage applied thereto, a starting circuit comprising starting capacitor means and contact means coupled to said stator windings for starting said motor, a running circuit comprising running capacitor means coupled to said stator windings for running said motor and for causing three phase voltage to be produced at said first, second, and third leads, a starting circuit control means coupled to said stator windings for causing said contact means of said starting circuit to close for starting said A-C motor and then to open after said motor starts, to disconnect said starting capacitor means, said first, second, and third leads being connectable to said stator windings of said A-C work producing motor for operating said A-C work producing motor from the three phase voltage produced at said first, second, and third leads, a booster system for applying starting capacitance to said stator windings of said A-C work producing motor, comprising:

first, second, and third booster leads coupled to said first, second, and third leads from said rotary phase generators respectively and to said stator windings of said A-C work producing motor, a booster starting circuit comprising booster capacitor means and booster contact means coupled to two of said booster leads, a booster control means comprising:

a booster voltage sensitive relay and a booster coil for controlling said booster contact means of said booster starting circuit, said booster voltage sensitive relay comprising a booster relay contact means, a booster time delay apparatus comprising a booster time delay contact means, said booster voltage sensitive relay being coupled to two of said booster leads, said booster time delay apparatus being coupled to two of said booster leads, a booster electrical lead connected from one of said booster leads to another of said booster leads and including said booster relay contact means, said booster time delay contact means, and said booster coil, said booster voltage sensitive relay being sensitive to the voltage produced at said stator windings of said A-C work producing motor for actuating said booster relay contact means for controlling power through said booster coil for causing said booster contact means of said booster starting circuit to close and then to open as the voltage at said stator windings of said A-C work producing motor increases to a given level after said A-C work producing motor begins to operate, said booster time delay apparatus being actuated after a given time that power is applied to said A-C work producing motor for controlling its booster time delay contact means for controlling power through said booster coil for causing said booster contact means of said booster starting circuit to open in the event that said booster voltage sensitive relay fails.

8. The system of claim 7, comprising:

means coupled to said first, second, and third leads from said rotary power generator, to said first, second, and third booster leads, and to said stator windings of said A-C work producing motor to allow said A-C work producing motor to start only from said booster system and then to run from the three phase voltage produced by said rotary phase generator.

9. A system for generating a 3 phase voltage output on first, second, and third leads from a single phase input voltage carried by said first and second leads, comprising:

a plurality of rotary phase generators each comprising an A-C motor having first, second, and third stator windings connected in a given configuration for generating a 3 phase voltage, the number of said rotary phase generators being greater than two, said first, second, and third stator windings of each of said rotary phase generators being connected to said first, second, and third leads respectively such that said plurality of rotary phase generators are connected to said first, second, and third leads in parallel, said first and second leads carrying said single phase voltage as an input being coupled to a first of said rotary phase generators, each of said other rotary phase generators except said first rotary phase generator starting off of the 3 phase voltage produced at said first, second, and third leads, there being no mechanical drive connection between any of said A-C motors of said plurality of rotary phase generators, for each of said other rotary phase generators, there being a time delay means coupled to the stator windings of the preceding rotary phase generator for controlling the application of the 3 phase voltage at said first, second, and third leads to said stator windings of each of said other rotary phase generators for allowing its A-C motor to start off of the 3 phase voltage produced at said first, second, and third leads at a time delay after power is applied to the A-C motor of the preceding rotary phase generator.

10. The system of claim 9 comprising a power factor means coupled to one of said leads and between at least one of said other rotary phase generators and the preceding rotary phase generators for allowing its motor to start only after the power factor as sensed at said one lead is at a desired value.

11. The system of claim 9 comprising:
a current sensitive means coupled to one of said leads and the time delay means of one of said rotary phase generator for allowing its motor to start only after the current on said lead is at a given level.

12. A rotary phase generator for generating a three phase voltage output from a single phase voltage input, comprising:

an A-C motor having first, second, and third stator windings connected in the given configuration, first, second, and third leads connected to said stator windings, said first and second leads being adapted to have a single phase line voltage applied thereto, said first, second, and third stator windings being connectible for line voltages of first or second levels, a starting circuit comprising first and second circuits, each comprising starting capacitor means and contact means, a running circuit comprising two groups of running capacitor means, each group comprising first and second circuits each of which comprises a capacitor means, the capacitance of said two groups of running capacitor means of said running circuit being different from each other, one end of each of said first and second circuits of said starting circuit and of one of said groups of running capacitor means being connected together by a first common lead, one end of each of said first and second circuits of the other group of running capacitor means being connected together by a second common lead, the other ends of said first circuits of said starting circuit and of said one group of running capacitor means being connected together, the other ends of said second circuits of said starting circuit and of said one group of running capacitor means being connected together, the other end of one of said circuits of said one group of running capacitor means being connectable to said stator windings, the other end of one of said circuits of the other group of running capacitor means being connectable to said stator windings, a starting circuit control means coupled to said stator windings for causing said contact means of said starting circuit to close for starting said A-C motor and then to open after said A-C motor starts, to disconnect said starting capacitor means, a dual voltage control means for connecting said starting circuit and said running circuit in a manner to allow said motor to operate on line voltages of first or second voltage levels for producing three phase voltage outputs of said first or second voltage levels at said first, second, and third leads, comprising:

first means connectable from said stator windings to either said first common lead or to the other end of said first circuit of said starting circuit, second means being connectable to the other ends of said first and second circuits of said starting circuit, third means being connectable to said first and second common leads, and fourth means being connectable to the other ends of said first and second circuits of said other group of running capacitor means.

13. A system for generating a three phase voltage output from a single phase voltage carried by first and second leads, comprising:

a first rotary phase generator comprising an A-C motor having first, second, and third stator windings connected in a given configuration, said first, second, and third leads being connected to said stator windings of said first rotary phase generator, a starting circuit comprising starting capacitor means coupled to said stator windings of said A-C motor of said first rotary phase generator for starting said A-C motor, a running circuit comprising capacitor means coupled to said stator windings of said A-C motor of said first rotary phase generator for running said A-C motor for causing three phase voltage to be produced at said first, second, and third leads, a second rotary phase generator comprising an A-C motor having first, second, and third stator windings connected in a given configuration, said stator windings of said A-C motor of said second rotary phase generator being coupled to said first, second, and third leads such that said A-C motor of said second rotary phase generator can start off of the three phase voltage produced at said first, second, and third leads, said A-C motors of said first and second rotary phase generators being free from mechanical drive connection therebetween, and a time delay means coupled to said A-C motor of said first rotary phase generator for controlling the application of the three phase voltage at said first, second, and third leads to said stator windings of said A-C motor of said second rotary phase generator for allowing said A-C motor of said second rotary phase generator to start off of the three phase voltage produced at said first, second, and third leads at a time delay after power is applied to said A-C motor of said first rotary phase generator.

14. The system of claim 13, comprising:

running capacitor means coupled to said stator windings of said A-C motor of said second rotary phase generator for use for running said A-C motor of said second rotary phase generator, said running capacitor means coupled to said A-C motor of said second rotary phase generator being separate and different from said running circuit coupled to said A-C motor of said first rotary phase generator.

15. The system of claim 14, comprising:

means for disconnecting said starting capacitor means from said stator windings of said A-C motor of said first rotary phase generator after said A-C motor of said first rotary phase generator starts.

16. A system for converting an A-C motor to a rotary phase generator for generating a three phase voltage output from a single phase voltage input, wherein the A-C motor has first, second, and third stator windings connected in a given configuration with first, second, and third leads connected to the stator windings and with the first and second leads being adapted to have a single phase voltage applied thereto, comprising:

a starting circuit comprising starting capacitor means and contact means adapted to be coupled to the stator windings of the A-C motor for starting the A-C motor, a running circuit comprising two groups of running capacitor means adapted to be coupled to the stator windings of the A-C motor for running the A-C motor and for causing three phase voltage to be produced at said first, second, and third leads, one of the two groups of running capacitor means being connectable to the first and third stator windings and the other of the two groups of running capacitor means being connected to the first and second stator windings, the capacitance of said two groups of running capacitor means of said running circuit being different from each other, and a starting circuit control means adapted to be coupled to the stator windings of the A-C motor for causing said contact means of said starting circuit to close for starting the A-C motor and then to open after the A-C motor starts, to disconnect said starting capacitor means.

17. The system of claim 16, wherein said starting circuit control means comprises:

voltage sensitive means connectable to a winding portion of the stator windings which produces a voltage when the motor begins to operate, which is dependent upon the RPM of the motor, said voltage sensitive means, when connected to the winding portion, causing said contact means of said starting circuit to open as the voltage at the winding portion of the A-C motor increases to a given level after the A-C motor begins to operate, and time delay means connectable to winding means of the stator windings which produces a voltage, when power is applied to the motor, which is independent of the RPM of the motor, said time delay means, when connected to the winding means, causing said contact means of said starting circuit to open at a given time after power is applied to the A-C motor in the event that said voltage sensitive means fails.

18. The system of claim 16, wherein said starting circuit control means comprises:

a voltage sensitive relay and a coil for controlling said contact means of said starting circuit, said voltage sensitive relay comprising a relay contact means, a time delay means comprising a time delay contact means, an electrical lead having two ends connectable to the stator windings of the A-C motor and including said relay contact means, said time delay contact means, and said coil connected in series, said voltage sensitive relay being connectable to a winding portion of the stator windings which produces a voltage when the motor begins to operate, which is dependent of the RPM of the motor, said voltage sensitive relay, when connected to the winding portion, being sensitive to the voltage produced at the winding portion of the A-C motor for actuating said relay contact means for controlling power through said coil for causing said contact means of said starting circuit to open as the voltage at the winding portion of the A-C motor increases to a given level after the A-C motor begins to operate, said time delay means being connectable to winding means of the stator windings which produces a voltage, when power is applied to the motor, which is independent of the RPM of the motor, said time delay means, when connected to the winding means being adapted to be actuated after a given time that power is applied to the A-C motor for controlling its time delay contact means for controlling power through said coil for causing said contact means of said starting circuit to open in the event that said voltage sensitive relay fails.

19. A system for converting an A-C motor to a rotary phase generator for generating a three phase voltage output from a single phase voltage input, wherein the A-C motor has first, second, and third stator windings connected in a given configuration with first, second, and third leads connected to the stator windings and with the first and second leads being adapted to have a single phase voltage applied thereto, comprising:

a starting circuit comprising starting capacitor means and contact means adapted to be coupled to the stator windings of the A-C motor for starting the A-C motor, a running circuit comprising running capacitor means adapted to be coupled to the stator windings of the A-C motor for running the A-C motor and for causing three phase voltage to be produced at said first, second, and third leads, a starting circuit control means adapted to be coupled to the stator windings of the A-C motor for causing said contact means of said starting circuit to close for starting the A-C motor and then to open after the A-C motor starts, to disconnect said starting capacitor means, said starting circuit control means comprising:
voltage sensitive means connectable to a winding portion of the stator windings which produces a voltage when the motor begins to operate, which is dependent upon the RPM of the motor,
said voltage sensitive means, when connected to the winding portion causing said contact means of said starting circuit to open as the voltage at the winding portion of the A-C motor increases to a given level after the A-C motor begins to operate, and
time delay means connectable to winding means of the stator windings which produces a voltage, when power is applied to the motor, which is independent of the RPM of the motor,
said time delay means, when connected to the winding means, causing said contact means of said starting circuit to open at a given time after power is applied to the A-C motor in the event that said voltage sensitive means fails.

20. A system for converting an A-C motor to a rotary phase generator for generating a three phase voltage output from a single phase voltage input, wherein the A-C motor has first, second, and third stator windings connected in a given configuration with first, second, and third leads connected to the stator windings and with the first and second leads being adapted to have a single phase voltage applied thereto, comprising:
a starting circuit comprising starting capacitor means and contact means adapted to be coupled to the stator windings of the A-C motor for starting the A-C motor,
a running circuit comprising running capacitor means adapted to be coupled to the stator windings of the A-C motor for running the A-C motor and for causing three phase voltage to be produced at said first, second, and third leads,
a starting circuit control means adapted to be coupled to the stator windings of the A-C motor for causing said contact means of said starting circuit to close for starting the A-C motor and then to open after the A-C motor starts, to disconnect said starting capacitor means,
said starting circuit control means comprising:
a voltage sensitive relay and a coil for controlling said contact means of said starting circuit,
said voltage sensitive relay comprising a relay contact means,
a time delay means comprising a time delay contact means,
an electrical lead having two ends connectable to the stator windings of the A-C motor and including said relay contact means, said time delay contact means, and said coil connected in series,
said voltage sensitive relay being connectable to a winding portion of the stator windings which produces a voltage when the motor begins to operate, which is dependent of the RPM of the motor,
said voltage sensitive relay, when connected to the winding portion, being sensitive to the voltage produced at the winding portion of the A-C motor for actuating said relay contact means for controlling power through said coil for causing said contact means of said starting circuit to open as the voltage at the winding portion of the A-C motor increases to a given level after the A-C motor begins to operate,
said time delay means being connectable to winding means of the stator windings which produces a voltage, when power is applied to the motor, which is independent of the RPM of the motor,
said time delay means, when connected to the winding means being adapted to be actuated after a given time that power is applied to the A-C motor for controlling its time delay contact means for controlling power through said coil for causing said contact means of said starting circuit to open in the event that said voltage sensitive relay fails.

21. A system for converting an A-C motor to a rotary phase generator for generating a three phase voltage output from a single phase voltage input, wherein the A-C motor has first, second, and third stator windings connected in a given configuration and being connectable for lines voltages of first and second voltage levels with first, second, and third leads connected to the stator windings and with the first and second leads beings adapted to have a single phase voltage applied thereto, comprising:
a starting circuit comprising first and second circuits, each comprising starting capacitor means and contact means,
a running circuit comprising two groups of running capacitor means, each group comprising first and second circuits each of which comprises a capacitor means,
the capacitance of said two groups of running capacitor means of said running circuit being different from each other,
one end of each of said first and second circuits of said starting circuit and of one of said groups of running capacitor means being connected together by a first common lead,
one end of each of said first and second circuits of the other group of running capacitor means being connected together by a second common lead,
the other ends of said first circuits of said starting circuit and of said one group of running capacitor means being connected together,
the other ends of said second circuits of said starting circuit and of said one group of running capacitor means being connected together,
the other end of one of said circuits of said one group of running capacitor means being connectable to the stator windings of the A-C motor,
the other end of one of said circuits of the other group of running capacitor means being connectable to the stator windings of the A-C motor,
a starting circuit control means connectable to the stator windings of the A-C motor for causing said contact means of said starting circuit to close for starting the A-C motor and then to open after the A-C motor starts, to disconnect said starting capacitor means,
a dual voltage control means for connecting said starting circuit and said running circuit in a manner to allow the A-C motor to operate on line voltages of first or second voltage levels for producing three phase voltage outputs of said first or second voltage levels at said first, second, and third leads, comprising:
first means connectable from the stator windings of the A-C motor to either said first common lead or to the other end of said first circuit of said starting circuit, second means bieng connectable to the other ends of said first and second circuits of said starting circuit, third means being connectable to said first and second common leads, and fourth means being connectable to the other ends of said first and second circuits of said other group of running capacitor means.

22. The system of claim 21, wherein:

the other end of one of said circuits of said one group of running capacitor means is connectable to the third stator winding of the A-C motor, the other end of one of said circuits of the other group of running capacitor means is connectable to the second stator winding of the A-C motor, said first means is connectable from the first stator winding of the A-C motor to either said first common lead or to the other end of said first circuit of said starting circuit.

23. The system of claim 22, wherein said starting circuit control means comprises:

voltage sensitive means for causing said contact means of said starting circuit to open as the voltage at the stator windings of the A-C motor increases to a given level after the A-C motor begins to operate, and time delay means for causing said contact means of said starting circuit to open at a given time after power is applied to the A-C motor in the event that said voltage sensitive means fails.

24. The system of claim 21, wherein said starting circuit control means comprises:

voltage sensitive means for causing said contact means of said starting circuit to open as the voltage at the stator windings of the A-C motor increases to a given level after the A-C motor begins to operate, and time delay means for causing said contact means of said staring circuit to open at a given time after power is applied to the A-C motor in the event that said voltage sensitive means fails.

25. A rotary phase generator for generating a three phase voltage output from a single phase voltage input comprising:

an A-C motor having first, second, and third stator windings connected in a given configuration, first, second, and third leads connected to said stator windings, said first and second leads being adpated to have a single phase voltage applied thereto, a starting circuit comprising starting capacitor means and contact means coupled to said stator windings for starting said motor, a running circuit comprising running capacitor means coupled to said stator windings for running said motor and for causing three phase voltage to be produced at said first, second, and third leads, a starting circuit control means coupled to said stator windings for causing said contact means of said starting circuit to close for starting said A-C motor and then to open after said A-C motor starts, to disconnect said starting capacitor means, said starting circuit control means, comprising:

voltage sensitive means connected to a winding portion of said stator windings which produces a voltage when said motor begins to operate, which is dependent upon the RPM of said motor, said voltage sensitive means causing said contact means of said starting circuit to open as the voltage at said winding portion increases to a given level after said motor begins to operate, and time delay means connected to winding means of said stator windings which produces a voltage, when power is applied to said motor, which is independent of the RPM of said motor, said time delay means causing said contact means of said starting circuit to open at a given time after power is applied to said motor in the event that said voltage sensitive means fails.

26. A system for generating a 3 phase voltage output from a single phase voltage carried by first and second leads, comprising:

a first rotary phase generator comprising an A-C motor having first, second, and third stator windings connected in a given configuration, said first and second leads and a third lead being connected to said stator windings of said first rotary phase generator, a starting circuit comprising starting capacitor means coupled to said stator windings of said A-C motor of said first rotary phase generator for starting said A-C motor, a running circuit comprising capacitor means coupled to said stator windings of said A-C motor of said first rotary phase generator for running said A-C motor for causing 3 phase voltage to be produced at said first, second, and third leads, a second rotary phase generator comprising an A-C motor having first, second, and third stator windings connected in a given configuration, said stator windings of said A-C motor of said second rotary phase generator being coupled to said first, second, and third leads such that said A-C motor of said second rotary phase generator can start off of the 3 phase voltage produced at said first, second, and third leads, there being no mechanical drive connection between said A-C motors of said first and second rotary phase generators, and a time delay means coupled to said stator windings of said A-C motor of said first rotary phase generator for controlling the application of the three phase voltage at said first, second, and third leads to said stator windings of said A-C motor of said second rotary phase generator for allowing said A-C motor of said second rotary phase generator to start off of the 3 phase voltage produced at said first, second, and third leads at a time delay after power is applied to said A-C motor of said first rotary phase generator.

27. The system of claim 26, comprising:

a running circuit comprising capacitor means coupled to said stator windings of said A-C motor of said second rotary phase generator.

28. The system of claim 26, comprising:

motor starting means including three normally open contact means coupled between said first, second, and third leads and said A-C motor of said second rotary phase generator and a coil for closing said normally open contact means when energized, said time delay means comprising normally open contact means which are closed when said time delay means is actuated, lead means coupled from said time delay means to said stator windings of said A-C motor of said first rotary phase generator for allowing said time delay means to be actuated at a time delay after power is applied to said A-C motor of said first rotary phase generator, said normally open contact means of said time delay means and said coil being part of a lead coupled between said first and second leads whereby when said time delay means is actuated, its normally open contact means are closed allowing said coil to be energized for closing said three normally open contact means of said motor starter means for allowing said A-C motor of said second rotary phase generator to start off of the three phase voltage produced at said first, second, and third leads.

29. The system of claim 26, comprising:

starting capacitor means and running capacitor means coupled to said stator windings of said A-C motor of said first rotary phase generator for use for starting and running said A-C motor of said first rotary phase generator, running capacitor means coupled to said stator winding of said A-C motor of said second rotary phase generator for use for running said A-C motor of said second rotary phase generator, said running capacitor means coupled to said A-C motor of said second rotary phase generator being separate and different from said running capacitor means coupled to said A-C motor of said first rotary phase generator.

30. The system of claim 29, comprising:

means for disconnecting said starting capacitor means from said stator windings of said A-C motor of said first rotary phase generator after said A-C motor of said first rotary phase generator starts.

31. A rotary phase generator for generating a three phase voltage output from a single phase voltage input comprising:

an A-C motor having first, second, and third stator windings connected in a given configuration, first, second, and third leads connected to said stator windings, said first and second leads being adapted to have a single phase voltage applied thereto, a starting circuit comprising starting capacitor means and contact means coupled to said stator windings for starting said motor, a running circuit comprising two groups of running capacitor means coupled to said stator windings for running said motor and for causing three phase voltage to be produced at said first, second, and third leads, the capacitance of said two groups of running capacitor means being different from each other, one of said two groups of running capacitor means being connected to said first and third stator windings and the other of said two groups of running capacitor means being connected to said first and second stator windings, a starting circuit control means coupled to said stator windings for causing said contact means of said starting circuit to close for starting said A-C motor and then to open after said A-C motor starts, to disconnect said starting capacitor means, said starting circuit control means comprising:

a voltage sensitive relay and a coil for controlling said contact means of said starting circuit, said voltage sensitive relay comprising a relay contact means, a time delay means comprising a time delay contact means, an electrical lead having two ends connected to said stator windings and including said relay contact means, said time delay contact means, and said coil connected in series, said voltage sensitive relay being connected to a winding portion of said stator windings which produces a voltage when said motor begins to operate, which is dependent of the RPM of said motor, said voltage sensitive relay being sensitive to the voltage produced at said winding portion for actuating said relay contact means for controlling power through said coil for causing said contact means of said starting circuit to open as the voltage at said winding portion increases to a given level after said motor begins to operate, said time delay means being connected to winding means of said stator windings which produces a voltage, when power is applied to said motor, which is independent of the RPM of said motor, said time delay means being actuated after a given time that power is applied to said motor for controlling its time delay contact means for controlling power through said coil for causing said contact means of said starting circuit to open in the event that said voltage sensitive relay fails.

* * * * *